(12) United States Patent
Ahn et al.

(10) Patent No.: US 9,136,754 B2
(45) Date of Patent: Sep. 15, 2015

(54) POWER SUPPLY DEVICE, DISPLAY DEVICE INCLUDING THE POWER SUPPLY DEVICE, AND DRIVING METHOD USING THE SAME

(75) Inventors: Jung-Keun Ahn, Yongin (KR); Shingo Kawashima, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 1006 days.

(21) Appl. No.: 12/659,445

(22) Filed: Mar. 9, 2010

(65) Prior Publication Data

US 2011/0043505 A1  Feb. 24, 2011

(30) Foreign Application Priority Data

Aug. 18, 2009  (KR) .................. 10-2009-0076412

(51) Int. Cl.
G09G 5/00 (2006.01)
H02M 3/07 (2006.01)
H05B 33/08 (2006.01)
G09G 3/32 (2006.01)

(52) U.S. Cl.
CPC .............. *H02M 3/07* (2013.01); *G09G 3/3233* (2013.01); *H05B 33/0857* (2013.01); *H05B 33/0896* (2013.01); *G09G 2330/021* (2013.01)

(58) Field of Classification Search
CPC ............. G09G 5/00; G09G 3/20; G09G 3/30; G09G 3/3208; G09G 3/3233
USPC ................ 345/82–102, 204, 212; 315/291
See application file for complete search history.

(56) References Cited

U.S. PATENT DOCUMENTS

| 5,297,014 | A | 3/1994 | Saito et al. |
| 8,232,775 | B2 * | 7/2012 | Eastlack ............... 320/140 |
| 2004/0196225 | A1 * | 10/2004 | Shimada ............... 345/82 |
| 2004/0213015 | A1 | 10/2004 | Ito et al. |
| 2007/0268218 | A1 | 11/2007 | Mizukoshi et al. |
| 2009/0027375 | A1 * | 1/2009 | Ryu et al. ............ 345/212 |
| 2009/0085901 | A1 | 4/2009 | Antony |
| 2009/0201281 | A1 | 8/2009 | Routley et al. |

FOREIGN PATENT DOCUMENTS

| JP | 09-090320 A | 4/1997 |
| JP | 10-215179 A | 8/1998 |
| JP | 2002 133882 A | 5/2002 |
| JP | 2004 273103 A | 9/2004 |
| JP | 2005-300929 A | 10/2005 |
| JP | 2006-065148 A | 3/2006 |
| JP | 2006-276713 A | 10/2006 |
| JP | 2006-284859 | 10/2006 |
| JP | 2007-004420 A | 1/2007 |
| JP | 2007-310033 A | 11/2007 |
| JP | 2008-243641 A | 10/2008 |

(Continued)

*Primary Examiner* — Amare Mengistu
*Assistant Examiner* — Stacy Khoo
(74) *Attorney, Agent, or Firm* — Lee & Morse, P.C.

(57) ABSTRACT

The described technology relates generally to a power supply, a display device including the same, and a driving method thereof to reduce power consumption of the display device. Embodiments include a power source voltage controller sensing a panel current flowing in the display panel and controlling a feedback voltage according to the panel current and the power source voltage, and a DC-DC converter generating a power source voltage according to the feedback voltage to respectively supply it to the plurality of light emitting elements.

18 Claims, 6 Drawing Sheets

(56) References Cited

FOREIGN PATENT DOCUMENTS

| | | |
|---|---|---|
| JP | 2009-508171 | 2/2009 |
| JP | 2009-186978 | 8/2009 |
| KR | 10 2007-0119930 A | 12/2007 |
| TW | I267045 B | 11/2006 |
| TW | 200701617 A | 1/2007 |
| TW | I282953 B | 6/2007 |

\* cited by examiner

POWER SUPPLY DEVICE, DISPLAY DEVICE INCLUDING THE POWER SUPPLY DEVICE, AND DRIVING METHOD USING THE SAME

BACKGROUND

1. Field

Embodiments relate generally to a power supply, a display device including the same, and a driving method thereof More particularly, embodiments generally relate to an organic light emitting diode (OLED) display and a driving method thereof.

2. Description of the Related Art

A display device includes a plurality of pixels arranged on a substrate in the form of a matrix, which form a display area, and scan and data lines connected to the respective pixels. Data signals are selectively applied to the pixels to display desired images. The display devices are classified into passive and active matrix types, depending upon the method of driving the pixels. In view of resolution, contrast, and response time, the current trend is toward the active matrix type where respective unit pixels are selectively turned on or off.

Display devices may be used as a display unit for a personal computer, a portable phone, a PDA, and other mobile information devices, or as a monitor for various kinds of information systems. A liquid crystal panel-based LCD, an organic light emitting diode (OLED) display, a plasma panel-based PDP, etc., are well known. Various kinds of emissive display devices, which are lighter in weight and smaller in volume than CRTs, have been recently developed. Among the emissive display devices, e.g., an organic light emitting diode display may be advantageous in terms of emissive efficiency, luminance, and viewing angle, and/or having a short response time.

However, in the case of the organic light emitting diode (OLED) display, an operation voltage range for light emitting the organic light emitting elements may change according to the temperature of the display device and the usage time of the display device. Accordingly, in the organic light emitting diode (OLED) display, although the operation voltage range may change, the driving power source applied to the organic light emitting diode (OLED) may have a margin within a predetermined range in an attempt to stably light emit the organic light emitting diode (OLED). This margin may result in unnecessary power consumption.

The above information disclosed in this Background section is only for enhancement of understanding of the background of the described technology and therefore it may contain information that does not constitute prior art that is already known in this country to a person of ordinary skill in the art.

SUMMARY

Embodiments are therefore directed to display devices and driving methods of display devices, which substantially overcome one or more of the problems due to the limitations and disadvantages of the related art.

It is therefore a feature of an embodiment to provide a power supply adapted supply power to a display device and to reduce power consumption of the display device.

It is therefore a separate feature of an embodiment to provide a display device employing a power supply adapted to reduce power consumption of the display device.

It is therefore a separate feature of an embodiment to provide a driving method for driving a display device employing a power supply adapted to reduce power consumption of the display device.

At least one of the above and other features and advantages may be realized by providing a power supply employable for supplying a power source voltage to a panel including a plurality of elements, the power supply including a power source voltage controller adapted to determine a panel current flowing in the panel, and to control a feedback voltage according to the panel current and the power source voltage, and a DC-DC converter adapted to generate the power source voltage according to the feedback voltage and to supply the power source voltage to the elements.

The power source voltage controller may include a feedback controller adapted to determine panel current data corresponding to the panel current and a predetermined target value corresponding to the power source voltage, and to generate a plurality of feedback voltage control signals, and a feedback voltage controller adapted to control the feedback voltage according to the plurality of feedback voltage control signals, wherein the DC-DC converter uses the feedback voltage control signals to control the power source voltage to correspond to the target value.

The DC-DC converter may use the feedback voltage control signals to control the power source voltage to equal the target value.

The panel may be a display panel and the plurality of elements include a plurality of light emitting elements, wherein the DC-DC converter is adapted to supply the power source voltage to the light emitting elements.

The DC-DC converter may be adapted to supply the power source voltage to a cathode of the plurality of light emitting elements through a power line, and the panel current may flow in the power line that includes a sensing resistor.

The power source voltage controller may further include an amplifier adapted to amplify a voltage difference between two terminals of the sensing resistor and to output an amplification voltage.

The power source voltage controller may further include an analog-digital converter adapted to output panel current data corresponding to the panel current according to the amplification voltage.

The feedback voltage controller may include a first resistor including one terminal connected to the power line, a plurality of second resistors connected in series between a second terminal of the first resistor and a terminal supplied with a reference voltage from the DC-DC converter, and a plurality of switches respectively connected in parallel with the plurality of second resistors, and adapted to perform a switching operation according to the corresponding feedback voltage control signal among the plurality of feedback voltage control signals.

The feedback voltage may be determined according to a resistance ratio between the plurality of second resistors and the first resistor.

The power source voltage controller may include a feedback controller adapted to determine panel current data corresponding to the panel current and a predetermined target value corresponding to the power source voltage, and to generate a reference voltage data, a digital-analog converter adapted to generate a reference voltage according to the reference voltage data, and a feedback voltage generator adapted to distribute a voltage difference between the power source voltage and the reference voltage into resistors to generate the feedback voltage, wherein the DC-DC converter uses the feedback voltage to control the power source voltage to correspond to the target value.

The DC-DC converter may use the feedback voltage to control the power source voltage to equal the target value.

The power source voltage controller may further include a buffer adapted to receive the reference voltage from the digital-analog converter and to output the reference voltage.

The feedback voltage generator may include a third resistor having one terminal connected to a power line supplied with the power source voltage from the DC-DC converter, a fourth resistor having one terminal connected to a second terminal of the third resistor, and a second terminal connected to an output terminal of the buffer, and a capacitor having one terminal connected to the output terminal of the buffer, and a second terminal that is grounded.

At least one of the above and other features and advantages may be separately realized by providing a display device, including a display panel including a plurality of light emitting elements, and supplied with a power source voltage, a power source voltage controller adapted to determine a panel current flowing in the display panel, and to control a feedback voltage according to the panel current and the power source voltage, and a DC-DC converter adapted to generate the power source voltage according to feedback voltage and to respectively supply the power source voltage to the plurality of light emitting elements.

The power source voltage controller may be further adapted to determine a panel current data corresponding to the panel current and a predetermined target value corresponding to the power source voltage, and to generate control signals based on the panel current data and the power source voltage for controlling the feedback voltage, and the DC-DC converter may be further adapted to generate the power source voltage to be substantially and/or completely equal to the predetermined target value based on the generated control signals.

At least one of the above and other features and advantages may be separately realized by providing a method for driving a display device, the method including determining a panel current flowing in a plurality of light emitting elements, controlling a feedback voltage according to the panel current and a power source voltage, and generating the power source voltage according to the feedback voltage, and respectively supplying the power source voltage to the light emitting elements.

Controlling of the feedback voltage may include determining a panel current data corresponding to the panel current and a predetermined target value corresponding to the power source voltage, generating at least one of reference voltage data and a plurality of feedback voltage control signals for controlling the feedback voltage, and controlling the feedback voltage according to the reference voltage data and/or the plurality of feedback voltage control signals, and generating the power source voltage may include using the reference voltage data and/or the feedback voltage control signals to control the power source voltage to correspond to the target value.

Generating the power source voltage may include using the reference voltage data and/or the feedback control signals to control the power source voltage to equal the target value.

Controlling of the feedback voltage may include distributing the power source voltage and a predetermined reference voltage according to a resistance ratio between a first resistor and a plurality of second resistors into a voltage, and selectively connecting the plurality of second resistors according to the plurality of feedback voltage control signals to control the resistance ratio.

Controlling the feedback voltage according to the panel current and a power source voltage may include determining a panel current data corresponding to the panel current and a predetermined target value corresponding to the power source voltage, and generating control signals based on the panel current data and the power source voltage for controlling the feedback voltage, and generating the power source voltage may include generating the power source voltage based on the generated control signals to be substantially and/or completely equal to the predetermined target value.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
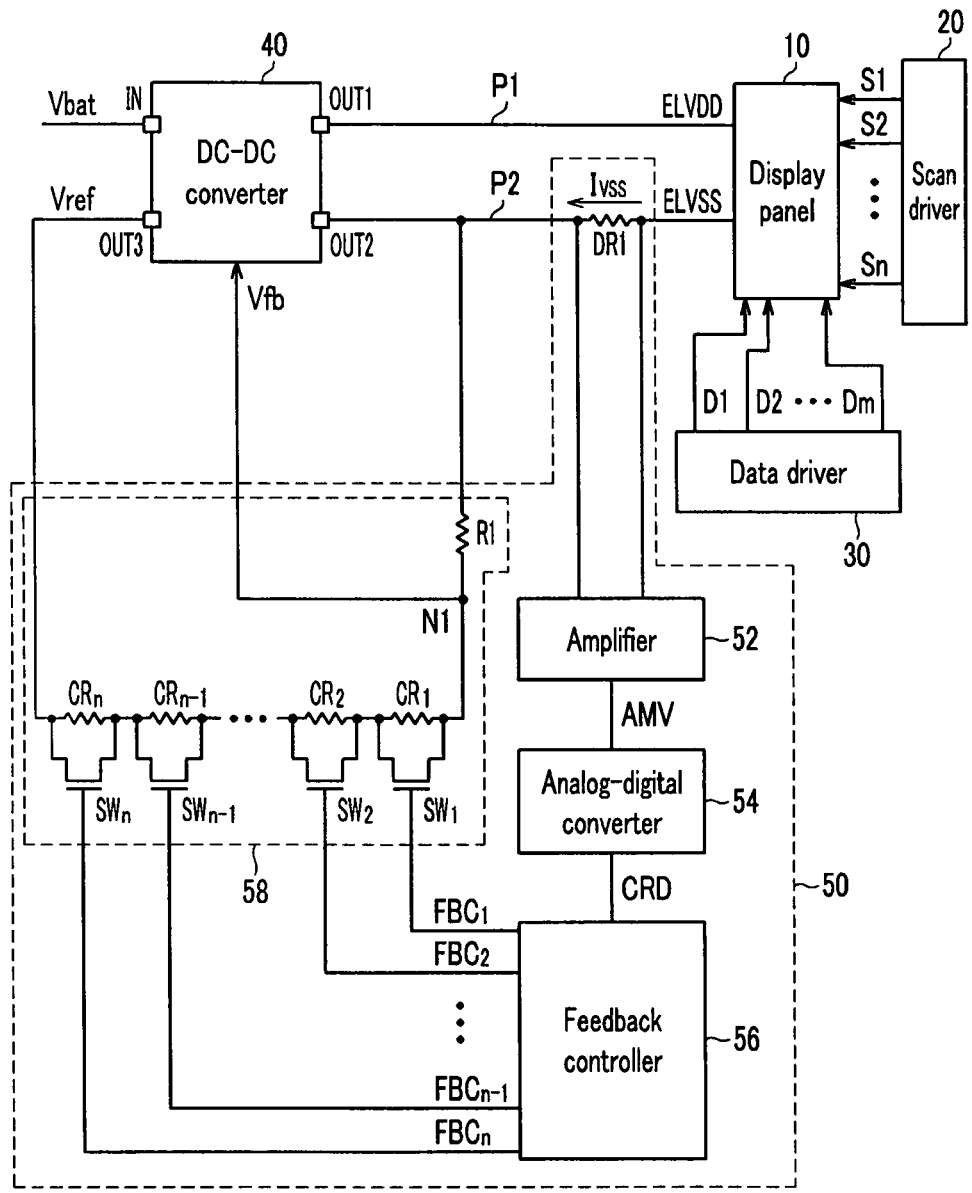
FIG. 1 illustrates a schematic diagram of an exemplary embodiment of a display device.

Korean Patent Application No. 10-2009-0076412, filed on Aug. 18, 2009, in the Korean Intellectual Property Office, and entitled: "Power Supply Device, Display Device Including the Power Supply Device, and Driving Method Using the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements. Like reference numerals refer to like elements throughout the specification.

As discussed in detail below, embodiments may provide a power supply having improved power consumption efficiency, which may be employed to supply a power supply to a display device. More particularly, as discussed in detail below, embodiments may provide a power supply including a controller that may be adapted to determine a current flowing through a display panel, to control a feedback voltage according the determined current and a power source voltage, and to generate the power source voltage according to the feedback voltage such that the power source voltage may substantially and/or completely equal a predetermined target value for the power source voltage. By controlling the power source voltage to be substantially and/or completely equal to the predetermined target value based on, e.g., operating conditions/ characteristics of the display panel, power consumption of the display device may be reduced.

Figure 2:
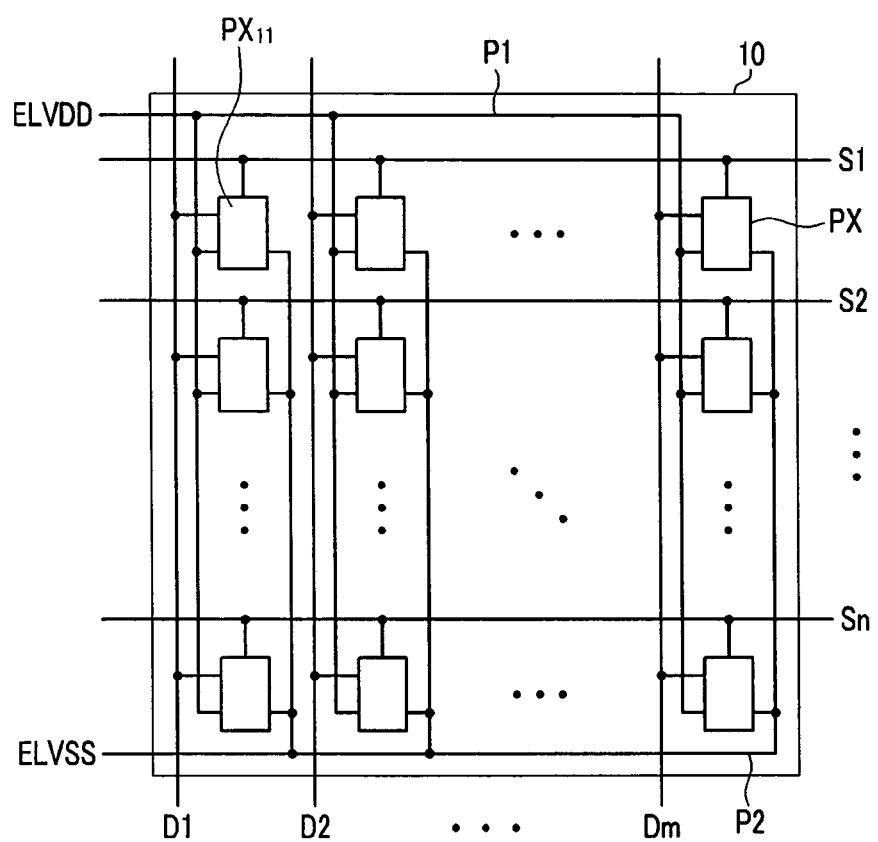
FIG. 2 illustrates a schematic diagram of a display panel employable by the display device shown in FIG. 1.
Figure 3:
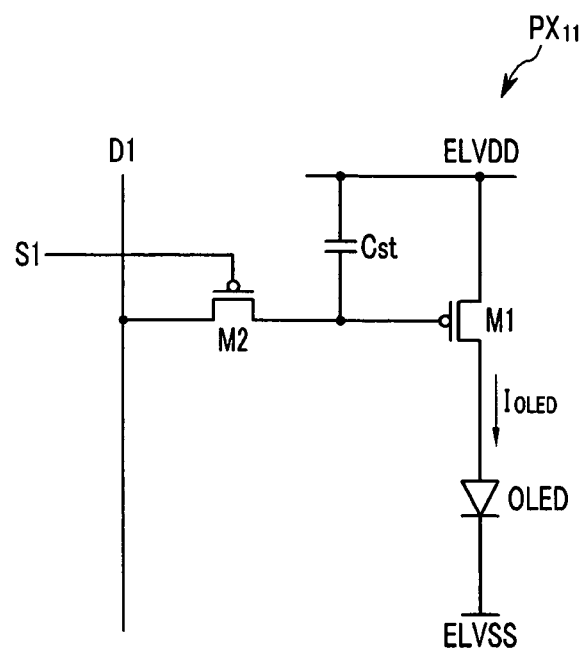
FIG. 3 illustrates a schematic diagram of an equivalent circuit of a pixel employable by the display panel shown in FIG. 2.
Figure 4:
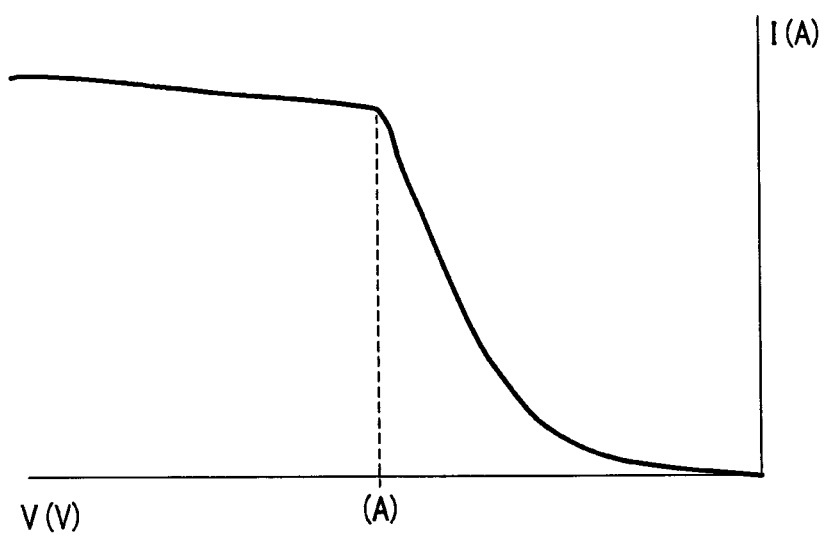
FIG. 4 illustrates a graph of a voltage-current characteristic curve that may be obtained from the display panel shown in FIG. 2.

FIG. 1 illustrates a schematic diagram of an exemplary embodiment of a display device. FIG. 2 illustrates a schematic diagram of an exemplary display panel employable as a display panel 10 in the display device shown in FIG. 1. FIG. 3 illustrates a schematic diagram of an equivalent circuit of a pixel employable as one or more of pixels PX in the display panel shown in FIG. 2. FIG. 4 illustrates a graph of a voltage-current characteristic curve that may be obtained from the display panel 10 shown in FIG. 2.

Referring to FIG. 1, a display device may include the display panel 10, a scan driver 20, a data driver 30, a DC-DC converter 40, and a power source voltage controller 50.

The display panel 10 may receive a first power source voltage ELVDD and a second power source voltage ELVSS from the DC-DC converter 40, a plurality of scan signals from the scan driver 20, and a plurality of data signals from the data driver 30, and may thereby displaying images.

Referring to FIG. 2, the display panel 10 may include a plurality of signal lines, e.g., scan lines S1-Sn and data lines D1-Dm, a first power line P1, a second power line P2, and a plurality of pixels PX that may be connected thereto and arranged, e.g., in a matrix form. The scan lines S1-Sn may sequentially transfer a plurality of scan signals, and the plurality of data lines D1-Dm may transfer a plurality of data signals. The signal lines may include a plurality of light emitting signal lines E1-En (not shown). The scan lines S1-Sn and the plurality of light emitting signal lines E1-En (not shown) may extend along a row direction and may be parallel to each other. The data lines D1-Dm may extend along a column direction and may be parallel to each other.

Referring to FIGS. 1 and 2, the first power line P1 may connect a first output terminal OUT1 of the DC-DC converter 40 to the display panel 10. The second power line P2 may connect the second output terminal OUT2 to the display panel 10. As shown in FIG. 2, the first power line P1 may extend to the pixels PX to respectively supply the first power source voltage ELVDD output from the first output terminal OUT1 to the pixels PX. The second power line P2 may extend to the pixels PX to respectively supply the second power source voltage ELVSS output from the second output terminal OUT2 to the pixels PX. More particularly, the second power line P2 may be connected to each cathode of the pixels PX such that a panel current (Ivss), which may correspond to a total of all current that flows in the pixels PX of the display panel 10, may flow in the second power line P2.

Referring to FIG. 3, a schematic diagram of an exemplary pixel $PX_{11}$, which may correspond to one, some or all of the pixels PX of the display panel 10 of FIG. 2 is illustrated. In the exemplary embodiment illustrated in FIG. 3, the pixel $PX_{11}$ is connected to a first of the scan lines S1 and a first of the data lines D1. The pixels PX, e.g., $PX_{11}$, may each include an organic light emitting diode OLED, a driving transistor M1, a capacitor Cst, and a switching transistor M2.

A source terminal of the driving transistor M1 may receive the first power source voltage ELVDD, and a drain terminal of the driving transistor M1 may be connected to an anode of the organic light emitting diode OLED. A gate terminal of the driving transistor M1 may be connected to a drain terminal of the switching transistor M2. The driving transistor M1 may outflow an electric current IDLED that may vary in dimension depending upon voltages held between control and output terminals.

A gate terminal of the switching transistor M2 may be connected to the scan line S1, and a source terminal of the switching transistor M2 may be connected to the data line D1.

The switching transistor M2 may operate as a switch based on a state of a corresponding scan signal applied to the scan line S1. When the switching transistor M2 is turned on, the corresponding data signal applied to the data line D1, e.g., a corresponding data voltage, may be transmitted to the gate terminal of the driving transistor M1.

The capacitor Cst may be connected between the source terminal and the gate terminal of the driving transistor M1. The capacitor Cst may charge the data voltage applied to the gate terminal of the driving transistor M1, and may store the data even after the switching transistor M2 is turned off.

A cathode of the organic light emitting diode OLED may receive the second power source voltage ELVSS. The organic light emitting element OLED may emit light of varied intensity based on characteristics of the electric current $I_{OLED}$ supplied from the driving transistor M1.

In the exemplary embodiment illustrated in FIG. 3, the driving transistor M1 and the switching transistor M2 are shown as p-channel field effect transistors (FETs), however embodiments are not limited thereto. For example, in some embodiments, at least one of the driving transistor M1 and the switching transistor M2 may be an n-channel field effect transistor. Also, in embodiments, the driving transistor M1, the switching transistor M2, the capacitor Cst, and/or the organic light emitting diode OLED may be connected differently. As discussed above, the pixel $PX_{11}$ shown in FIG. 3 illustrates an exemplary pixel of a display device, and another pixel having a different structure having, e.g., at least two transistors and/or at least one capacitor may be used instead.

Again referring to FIG. 1, the scan driver 20 may be connected to the scan lines S1 to Sn of the display panel 10, and may sequentially apply respective scan signals to the scan lines S1 to Sn. The data driver 30 may be connected to the data lines D1-Dm of the display panel 10, may generate a plurality of data signals, and may apply the generated data signals to the data lines D1-Dm, respectively.

An input terminal IN of the DC-DC converter 40 may receive an input voltage Vbat and may generate the first power source voltage ELVDD, the second power source voltage ELVSS, and a reference voltage Vref. The first power source voltage ELVDD and the reference voltage Vref may be fixed, and the second power source voltage ELVSS may be changed according to a feedback voltage Vfb.

The power source voltage controller 50 may include a sensing resistor DR1, an amplifier 52, an analog-digital converter 54, a feedback controller 56, and a feedback voltage controller 58. The sensing resistor DR1 may be disposed in the second power line P2. The panel current Ivss may flow in the second power line P2 and may flow in the sensing resistor DR1 such that a voltage difference is generated between two terminals of the sensing resistor DR1. The power source voltage controller 50 may sense the panel current Ivss based on the voltage between the two terminals of the sensing resistor DR1. Hereinafter, the respective voltage difference between the two terminals of sensing resistor DR1 is referred to as a sensing voltage VS.

The amplifier 52 may amplify the sensing voltage VS and transmit the amplified sensing voltage VS (hereinafter referred to as an amplification voltage AMV) to the analog-digital converter 54. The analog-digital converter 54 may output a data CRD (hereinafter referred to as a panel current data) for the panel current Ivss according to the amplification voltage AMV.

The feedback controller 56 may output a plurality of feedback voltage control signals FBC1-FBCn, which may be used to generate the feedback voltage Vfb based on panel current data (CRD) and the second power source voltage ELVSS. The feedback controller 56 may determine a predetermined target value A corresponding to the panel current data CRD and the second power source voltage ELVSS, and may control the feedback voltage Vfb to enable the second power source voltage ELVSS to be equal to the predetermined target value A. More particularly, e.g., some embodiments may control the feedback voltage Vfb so as to enable the second power source voltage ELVSS to be at least closer to and/or the predetermined target value A in order to improve power consumption efficiency of the display panel 10.

The target value A may be a predetermined value corresponding, e.g., to a value at which a slope of a corresponding voltage-current characteristic curve of the display panel 10 rapidly changes. For example, FIG. 4 represents a change in the panel current Ivss relative to the second power source voltage ELVSS as a result of changes in a level of the second power source voltage ELVSS within a predetermined range that may occur after setting the level of the first power source voltage ELVDD. The target value A in the voltage-current characteristic curve may be determined according characteristics of the display panel 10. When the second power source voltage ELVSS is determined to be a value less than the target value A (the left direction of the horizontal axis of FIG. 4), unnecessary power consumption may be generated to generate the second power source voltage ELVSS. When the second power source voltage ELVSS is determined to be a value more than the target value A (the right direction of the horizontal axis of FIG. 4), the display panel current may be limited such that a full white grayscale may not be displayed.

In an exemplary embodiment, the DC-DC converter 40 may increase the second power source voltage ELVSS when the feedback voltage Vfb is decreased, and may decrease the second power source voltage ELVSS when the feedback voltage Vfb is increased. In such embodiments, when the panel current data CRD is less than the target value A, the feedback controller 56 may decrease the feedback voltage Vfb, and when the panel current data CRD is more than the target value A, the feedback controller 56 may increase the feedback voltage Vfb. Thus, the second power source voltage ELVSS may be controlled to an effective value thereof corresponding to improved power consumption efficiency based on the driving characteristics of the display panel 10.

The feedback voltage controller 58 may control and transmit the feedback voltage Vfb to the DC-DC converter 40 according to the plurality of feedback voltage control signals FBC1-FBCn. The feedback voltage controller 58 may include a resistor R1, a plurality of resistors CR1-CRn, and a plurality of switches SW1-SWn. The resistor R1 may be connected between the second output terminal OUT2 of the DC-DC converter 40 and a node N1. The resistors CR1-CRn may be connected in series between the node N1 and a third output terminal OUT3 of the DC-DC converter 40. The switches SW1-SWn may be respectively connected between one terminal and the other terminal of the resistors CR1-CRn, and may thereby be operated according to the feedback voltage control signals FBC1-FBCn. A resistance ratio between the resistor R1 and the plurality of resistors CR1-CRn may be controlled according to the on/off operation of the switches SW1-SWn such that a potential of the node N1, that is, the level of the feedback voltage Vfb, may be changed.

For example, if the switch SW1 of the plurality of switches SW1-SWn is turned on, the switch SW1 and the resistor CR1 are connected in parallel. Here, the on-resistance of the switch SW1 may be very low and a sum of the on-resistance of the switch SW1 and the resistor CR1 may be very low, e.g., even lower. Accordingly, the total resistance of the plurality of resistors CR1-CRn may be decreased as the number of switches that are turned on among the plurality of switches SW1-SWn is increased. If the total resistance of the plurality of resistors CR1-CRn is decreased, the feedback voltage Vfb may be decreased and the second power source voltage ELVSS may be increased.

In an exemplary embodiment, the switches SW1-SWn may each be an n-channel field effect transistor. In such embodiments, if the plurality of feedback voltage control signals FBC1-FBCn have, e.g., a high voltage level, the plurality of switches SW1-SWn are turned on, and if the plurality of feedback voltage control signals FBC1-FBCn have, e.g., a low voltage level, the switches SW1-SWn are turned off Embodiments are not limited thereto. For example, the plurality of switches SW1-SWn may be p-channel field effect transistors.

Figure 5:
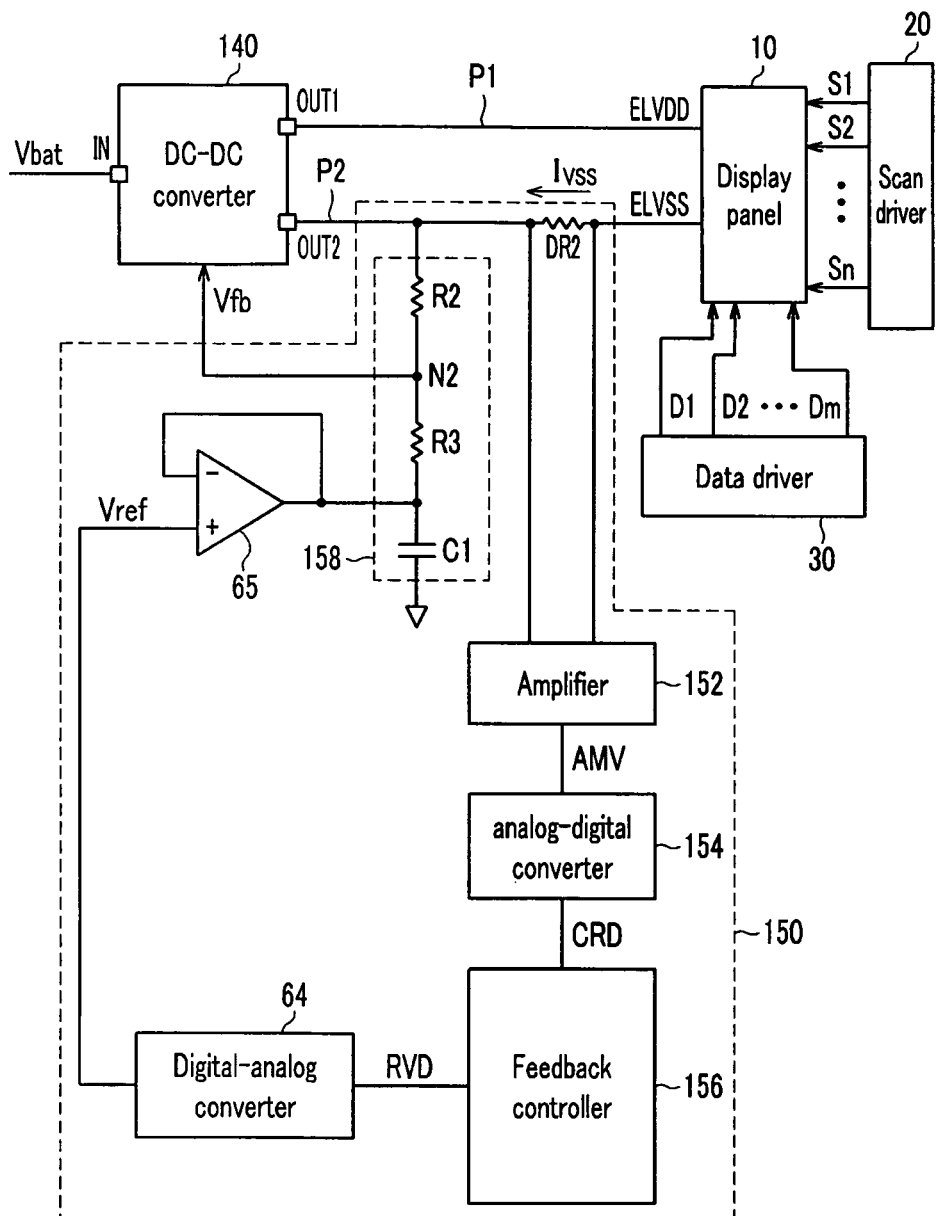
FIG. 5 illustrates a schematic diagram of another exemplary embodiment of a display device.

FIG. 5 illustrates a schematic diagram of another exemplary embodiment of a display device.

Referring to FIG. 5, a display device may include the display panel 10, the scan driver 20, the data driver 30, a power source voltage controller 150, and a DC-DC converter 140. The display panel 10, the scan driver 20, and the data driver 30 of FIG. 5 are the same as the configuration of FIG. 1 such that the same numeral numbers are used and detailed descriptions thereof are omitted.

The power source voltage controller 150 may include a sensing resistor DR2, an amplifier 152, an analog-digital converter 154, a feedback controller 156, a digital-analog converter 64, a buffer 65, and a feedback voltage generator 158.

The sensing resistor DR2 may be disposed on the second power line P2, and a panel current Ivss flowing in the second power line P2 may flows in the sensing resistor DR2 such that a voltage difference may be generated between two terminals of the sensing resistor DR2. The power source voltage controller 150 may sense the panel current Ivss based on the voltage of the two terminals of the sensing resistor DR2. Hereinafter, the voltage difference of both terminals of the sensing resistor DR2 is referred to as a sensing voltage VS. The amplifier 152 may amplify the sensing voltage VS, and may transmit the amplified sensing voltage VS (hereinafter referred to as an amplification voltage AMV) to the analog-digital converter 154.

The analog-digital converter 154 may output data CRD (hereinafter referred to as a panel current data) for the amplification voltage AMV according to the panel current Ivss. The feedback controller 156 may output reference voltage data RVD controlling a feedback voltage Vfb according to the panel current data CRD and the second power source voltage ELVSS. The feedback controller 156 may determine a predetermined target value A corresponding to the panel current data CRD and the second power source voltage ELVSS using a corresponding voltage-current characteristic curve, e.g., the voltage-characteristic curve shown in FIG. 4, and may control the feedback voltage Vfb for the second power source voltage ELVSS to be equal to, or at least closer in value to, the target value A.

The digital-analog converter 64 may output a reference voltage Vref according to the reference voltage data RVD. The buffer 65 may receive the reference voltage Vref from the digital-analog converter 64 and may output it. The feedback voltage generator 158 may distribute a voltage difference between the second power source voltage ELVSS and the reference voltage Vref in a resistance ratio between a resistor R2 and a resistor R3 to output the feedback voltage Vfb. Accordingly, if the reference voltage Vref is increased, the feedback voltage Vfb may be increased, and if the reference voltage Vref is decreased, the feedback voltage Vfb may be decreased. If the feedback voltage Vfb is decreased, the second power source voltage ELVSS may be increased, and if the feedback voltage Vfb is increased, the second power source voltage ELVSS may be decreased. In embodiments, the second power source voltage ELVSS may always equal the target value A. As described above, the second exemplary embodiment may control the feedback voltage Vfb by controlling the reference voltage Vref.

More particularly, the feedback voltage generator 158 may include the resistors R2, R3 and a capacitor C1. The resistor R2 may be connected between a second output terminal OUT2 of the DC-DC converter 140 and a node N2. The resistor R3 may be connected between the node N2 and an output terminal of the buffer 65. The capacitor C1 may be connected between the output terminal of the buffer 65 and a ground terminal. The capacitor C1 may store the reference voltage Vref output from the output terminal of the buffer 65 for a predetermined time. The DC-DC converter 140 may receive an input voltage Vbat from the input terminal IN and may generate the first and second power source voltages ELVDD and ELVSS. The first power source voltage ELVDD may have a fixed level, and the second power source voltage ELVSS may be changed according to the feedback voltage Vfb.

In embodiments, the panel current of the display panel may be sensed to determine a target value corresponding to the panel current and the power source voltage ELVSS. A feedback voltage may be controlled for the power source voltage ELVSS to be equal to, or at least closer in value to, the target value. Accordingly, the power source voltage may be supplied to the display panel without a margin such that unnecessary power consumption resulting therefrom may be reduced and/or eliminated.

Figure 6:
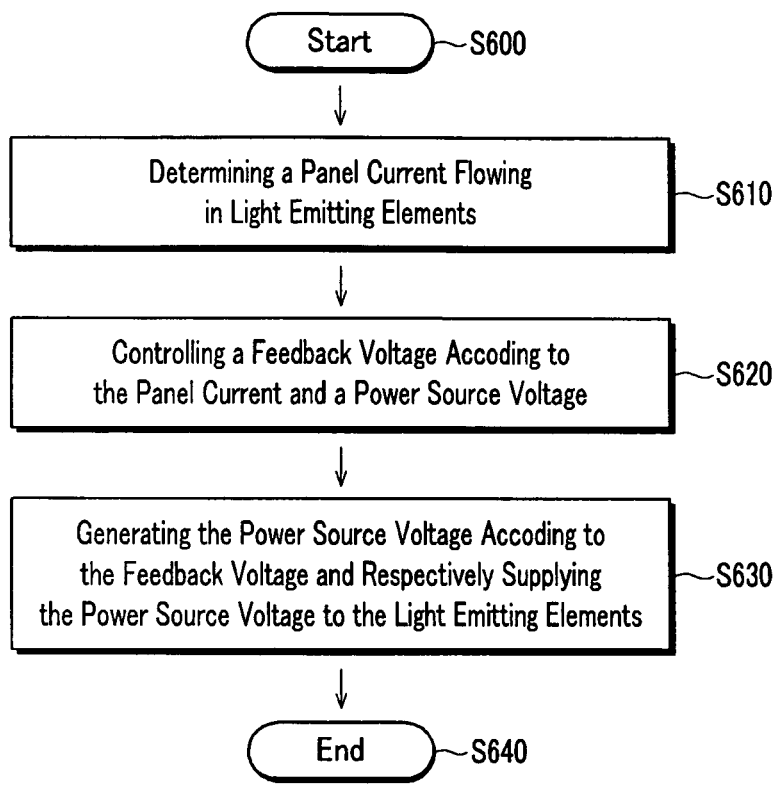
FIG. 6 illustrates a flow chart of exemplary methods of driving a display device.

FIG. 6 illustrates a flow chart of exemplary methods of driving a display device. Referring to FIG. 6, an exemplary method of driving a display device may begin at operation S600 and may include determining a panel current flowing in light emitting elements (S610), controlling a feedback voltage according to the panel current and a power source voltage (S620), and generating the power source voltage according to the feedback voltage and respectively supplying the power source voltage to the light emitting elements (S630), and the operation may end in operation (S640).

More particularly, when driving, e.g., the exemplary display device of FIG. 1, controlling the feedback voltage (S620) may include determining a predetermined target value corresponding to the power source voltage, and generating a plurality of control signals for controlling the feedback voltage to be supplied to the DC-DC converter 40.

More particularly, when driving, e.g., the exemplary display device of FIG. 5, controlling the feedback voltage (S620) may include determining a predetermined target value corresponding to the power source voltage, and generating reference voltage data for controlling the feedback voltage to be supplied to the DC-DC converter 140.

As discussed in detail above, embodiments may enable a power source voltage to be controlled based on a detected current flowing through a panel and a predetermined target value, such that the power source voltage may be substantially and/or completely equal to the target value and power consumption to be reduced.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A power supply employable for supplying a power source voltage including a first power source voltage and a second power source voltage to a panel including a plurality of elements, the power supply comprising:
   a power source voltage controller to generate panel current data corresponding to a total current flowing in the plurality of elements of the panel by varying the second power source voltage within a predetermined range and fixing the first power source voltage, to obtain a power source voltage-panel current characteristic curve based on the panel current data of the second power source voltage, the power source voltage-panel current characteristic curve representing a change of the total current of the second power source voltage, to determine a target voltage value based on the power source voltage-panel current characteristic curve, and to control a feedback voltage for controlling the second power source voltage to be at least substantially equal to the target voltage value; and
   a DC-DC converter to generate the first and second power source voltages, to control a voltage difference between the first and second power source voltages according to the feedback voltage, and to supply the second power source voltage to the elements, wherein
   an optimization of the second power source voltage is controlled by increasing or decreasing the feedback voltage according to the target voltage value determined in the power source voltage-panel current characteristic curve, wherein:
   when the second power source voltage is higher than the target voltage, the total current is limited such that the panel is not able to display a full white grayscale, and
   when the second power source voltage is lower than the target voltage, unnecessary power consumption is caused to generate the second power source voltage.

2. The power supply as claimed in claim 1, wherein the power source voltage controller includes:
   a feedback controller to generate a feedback voltage control signal corresponding to the total current, and to determine the target voltage value corresponding to the second power source voltage; and
   a feedback voltage controller to control the feedback voltage according to the feedback voltage control signal, wherein the DC-DC converter uses the feedback voltage control signal to control the second power source voltage to correspond to the target voltage value.

3. The power supply as claimed in claim 2, wherein the DC-DC converter uses the feedback voltage control signal to control the second power source voltage to at least substantially equal the target voltage value.

4. The power supply as claimed in claim 2, wherein the feedback voltage controller includes:
   a first resistor including one terminal connected to the power line;
   a plurality of second resistors connected in series between a second terminal of the first resistor and a terminal supplied with a reference voltage from the DC-DC converter; and
   a plurality of switches respectively connected in parallel with the plurality of second resistors, the plurality of switches to perform a switching operation according to the corresponding feedback voltage control signal among a plurality of feedback voltage control signals.

5. The power supply as claimed in claim 4, wherein the feedback voltage is determined according to a resistance ratio between the plurality of second resistors and the first resistor.

6. The power supply as claimed in claim 1, wherein the panel is a display panel and the plurality of elements include a plurality of light emitting elements, and wherein the DC-DC converter is to supply the second power source voltage to the light emitting elements.

7. The power supply as claimed in claim 6, wherein
the DC-DC converter is to supply the second power source voltage to a cathode of each of the plurality of light emitting elements through a power line, and
the total current flows in the power line that includes a sensing resistor.

8. The power supply as claimed in claim 7, wherein
the power source voltage controller further includes an amplifier to amplify a voltage difference between two terminals of the sensing resistor and to output an amplification voltage.

9. The power supply as claimed in claim 8, wherein the power source voltage controller further includes an analog-digital converter to output the panel current data corresponding to the total current according to the amplification voltage.

10. The power supply as claimed in claim 1, wherein the power source voltage controller includes:
a feedback controller to generate a feedback voltage control signal corresponding to the total current, to determine the target voltage value corresponding to the second power source voltage, and to generate a reference voltage data;
a digital-analog converter to generate a reference voltage according to the reference voltage data; and
a feedback voltage generator to distribute a voltage difference between the second power source voltage and the reference voltage into resistors to generate the feedback voltage, wherein the DC-DC converter uses the feedback voltage to control the second power source voltage to at least substantially equal the target voltage value.

11. The power supply as claimed in claim 10, wherein the power source voltage controller further includes a buffer to receive the reference voltage from the digital-analog converter and to output the reference voltage.

12. The power supply as claimed in claim 11, wherein the feedback voltage generator includes:
a first resistor having a first terminal connected to a power line supplied with the second power source voltage from the DC-DC converter;
a second resistor having a first terminal connected to a second terminal of the first resistor, and a second terminal connected to an output terminal of the buffer; and
a capacitor having a first terminal connected to the output terminal of the buffer, and a second terminal that is grounded.

13. A display device, comprising:
a display panel including a plurality of light emitting elements, and supplied with a power source voltage including a first power source voltage and a second power source voltage;
a power source voltage controller to generate panel current data corresponding to a total current flowing in the light emitting elements of the panel by varying the second power source voltage within a predetermined range and fixing the first power source voltage, to obtain a power source voltage-panel current characteristic curve based on the panel current data of the second power source voltage, the power source voltage-panel current characteristic curve representing a change of the total current of the second power source voltage, to determine a target voltage value based on the power source voltage-panel current characteristic curve, and to control a feedback voltage for controlling the second power source voltage to be at least substantially equal to the target voltage value; and
a DC-DC converter to generate the first and second power source voltages, to control a voltage difference between the first and second power source voltages according to the feedback voltage, and to respectively supply the second power source voltage to the plurality of light emitting elements, wherein an optimization of the second power source voltage is controlled by increasing or decreasing the feedback voltage according to the target voltage value determined in the power source voltage-panel current characteristic curve, wherein:
when the second power source voltage is higher than the target voltage, the total current is limited such that the panel is not able to display a full white grayscale, and
when the second power source voltage is lower than the target voltage, unnecessary power consumption is caused to generate the second power source voltage.

14. The display device as claimed in claim 13, wherein
the power source voltage controller is further to generate control signals based on the panel current data and the second power source voltage for controlling the feedback voltage, and
the DC-DC converter is further to generate the second power source voltage to be at least substantially equal to the target voltage value based on the generated control signals.

15. A method for driving a display device, the method comprising:
generating panel current data corresponding to a total current flowing in a plurality of light emitting elements included in a panel of the display device by varying a power source voltage, the power source voltage including a first power source voltage and a second power source voltage;
determining a target voltage value for the plurality of light emitting elements by using a power source voltage-panel current characteristic curve based on the panel current data of the second power source voltage, the power source voltage-panel current characteristic curve representing a change of the total current of the second power source voltage, the change being determined by varying the second power source voltage within a predetermined range and fixing the first power source voltage; and
adjusting the second power source voltage by controlling a feedback voltage according to the target voltage value determined in the power source voltage-panel current characteristic curve, wherein:
when the second power source voltage is higher than the target voltage, the total current is limited such that the panel is not able to display a full white grayscale, and
when the second power source voltage is lower than the target voltage, unnecessary power consumption is caused to generate the second power source voltage.

16. The method as claimed in claim 15,
wherein controlling the feedback voltage includes:
determining the panel current data corresponding to the total current and the target voltage value corresponding to the second power source voltage,
generating at least one of reference voltage data and a plurality of feedback voltage control signals for controlling the feedback voltage, and controlling the feedback voltage according to the reference voltage data and/or the plurality of feedback voltage control signals; and generating the second power source voltage by using the reference voltage data and/or the feedback voltage control signals to control the second power source voltage to at least substantially equal the target voltage value.

17. The method as claimed in claim 16, wherein controlling the feedback voltage includes distributing the second power source voltage and a predetermined reference voltage according to a resistance ratio between a first resistor and a plurality of second resistors into a voltage, and selectively connecting the plurality of second resistors according to the plurality of feedback voltage control signals to control the resistance ratio.

18. The method as claimed in claim 15, wherein controlling the feedback voltage includes:

determining data corresponding to the total current and the target voltage value corresponding to the second power source voltage, and generating control signals based on the panel current data and the second power source voltage for controlling the feedback voltage; and generating the second power source voltage based on the generated control signals to be at least substantially equal to the target voltage value.

* * * * *